(12) United States Patent
Mishra et al.

(10) Patent No.: US 10,547,660 B2
(45) Date of Patent: Jan. 28, 2020

(54) ADVERTISING MEDIA PROCESSING CAPABILITIES (71) Applicant: Bose Corporation, Framingham, MA (US)

(72) Inventors: Rajesh Mishra, Needham, MA (US); Brian Robert White, Hudson, MA (US); David Marino, Framingham, MA (US); Joseph Thomas Dzado, Watertown, MA (US)

(73) Assignee: Bose Corporation, Framingham, MA (US)

( * ) Notice: Subject to any disclaimer, the term of this patent is extended or adjusted under 35 U.S.C. 154(b) by 152 days.

(21) Appl. No.: 15/262,502

(22) Filed: Sep. 12, 2016

(65) Prior Publication Data

US 2018/0077215 A1 Mar. 15, 2018

(51) Int. Cl.
*H04L 29/06* (2006.01)
*H04L 29/08* (2006.01)

(52) U.S. Cl.
CPC ........ *H04L 65/605* (2013.01); *H04L 65/4069* (2013.01); *H04L 67/303* (2013.01)

(58) Field of Classification Search
CPC ............... H04L 65/605; H04L 67/2809; H04L 65/4069; H04L 67/303; H04L 69/24
See application file for complete search history.

(56) References Cited

U.S. PATENT DOCUMENTS 7,203,557 B1 * 4/2007 Thompson .............. H04S 3/008
700/94
8,666,161 B2 * 3/2014 Van Hoof ................ G06K 9/00
358/1.9

(Continued)

FOREIGN PATENT DOCUMENTS

EP          2 988 494           2/2016
WO     WO 2009/010632          1/2009
WO     WO-2009010632 A1 *      1/2009   ......... H04L 65/1069

OTHER PUBLICATIONS

International Search Report & Written Opinion; PCT/US2017/049665; dated Nov. 10, 2017; 17 pages.

(Continued)

*Primary Examiner* — Gil H. Lee
*Assistant Examiner* — Javier O Guzman
(74) *Attorney, Agent, or Firm* — Fish & Richardson P.C.

(57) ABSTRACT

The technology described in this document can be embodied in a method that includes receiving, at an intermediate device disposed between a source device and a destination device, capability information indicative of media rendering capabilities of the destination device, and determining to process at the intermediate device at least a portion of data received from the source device. The method also includes generating, responsive to such determination, updated capability information to replace one or more media rendering capabilities of the destination device with corresponding one or more media rendering capabilities of the intermediate device. The one or more media rendering capabilities of the intermediate device pertains to the portion of the data to be processed by the intermediate device. The method further includes transmitting the updated capability information to the source device, wherein the updated capability information is usable by the source device to generate the data.

31 Claims, 7 Drawing Sheets

(56) References Cited

U.S. PATENT DOCUMENTS

| | | | |
|---|---|---|---|
| 9,137,501 B2* | 9/2015 | Wang | H04L 67/2823 |
| 2002/0049610 A1* | 4/2002 | Gropper | G06Q 30/02 |
| | | | 705/1.1 |
| 2004/0133701 A1* | 7/2004 | Karaoguz | H04H 60/80 |
| | | | 709/246 |
| 2008/0080596 A1* | 4/2008 | Inoue | G06F 3/14 |
| | | | 375/211 |
| 2009/0081948 A1* | 3/2009 | Banks | H04R 5/02 |
| | | | 455/3.05 |
| 2010/0229194 A1 | 9/2010 | Blanchard et al. | |
| 2012/0016965 A1* | 1/2012 | Chen | H04N 21/23439 |
| | | | 709/219 |
| 2012/0133841 A1 | 5/2012 | Vanderhoff et al. | |
| 2012/0155657 A1* | 6/2012 | Takao | H04N 7/142 |
| | | | 381/57 |
| 2012/0188456 A1 | 7/2012 | Kuroyanagi | |
| 2012/0236949 A1* | 9/2012 | Keating | H04N 21/4122 |
| | | | 375/259 |
| 2012/0311654 A1* | 12/2012 | Dougherty, III | H04L 63/102 |
| | | | 725/127 |
| 2013/0275615 A1* | 10/2013 | Oyman | H04L 65/60 |
| | | | 709/231 |
| 2014/0044276 A1* | 2/2014 | Hulvey | H04B 7/00 |
| | | | 381/77 |
| 2014/0281559 A1* | 9/2014 | Trachtenberg | H04L 63/0457 |
| | | | 713/178 |
| 2014/0289309 A1* | 9/2014 | Mitchell, Jr. | H04L 65/605 |
| | | | 709/203 |
| 2015/0062441 A1 | 3/2015 | Martin | |
| 2015/0128164 A1 | 5/2015 | Fundament et al. | |
| 2015/0208190 A1* | 7/2015 | Hooks | H04R 1/403 |
| | | | 381/303 |
| 2015/0295982 A1* | 10/2015 | Kafle | H04L 65/1083 |
| | | | 709/219 |
| 2016/0142647 A1 | 5/2016 | Gopinath et al. | |
| 2016/0173931 A1* | 6/2016 | Eber | H04N 21/242 |
| | | | 725/38 |
| 2016/0350061 A1* | 12/2016 | Turner | G06F 3/1454 |

OTHER PUBLICATIONS

International Search Report & Written Opinion; PCT/US2017/049925; dated Dec. 19, 2017; 14 pages.
DVB Organization. EBU-tech3344.pdf; Practical guidelines for distribution systems in accordance with EBU R 128; Geneva, Switzerland; May 3, 2011; XP017833964.

* cited by examiner

FIG. 5 ns also include generating, responsive to determining to process at least a portion of the data received from the source device at the intermediate device, updated capability information to replace one or more media rendering capabilities of the destination device with corresponding one or more media rendering capabilities of the intermediate device. The one or more media rendering capabilities of the intermediate device pertains to the portion of the data to be processed by the intermediate device. The operations further include transmitting the updated capability information to the source device, wherein the updated capability information is usable by the source device to generate the data.

ADVERTISING MEDIA PROCESSING CAPABILITIES

TECHNICAL FIELD

This disclosure generally relates to electronic devices having remote controllers that may be used for controlling one or more other devices.

BACKGROUND

The acoustic experience associated with a television can be improved via acoustic devices such as home theater systems, sound-bars etc.

SUMMARY

In one aspect, this document features a method that includes receiving, at an intermediate device disposed between a source device and a destination device, capability information indicative of media rendering capabilities of the destination device, and determining to process at the intermediate device at least a portion of data received from the source device. The method also includes generating, responsive to determining to process at least a portion of the data received from the source device at the intermediate device, updated capability information to replace one or more media rendering capabilities of the destination device with corresponding one or more media rendering capabilities of the intermediate device. The one or more media rendering capabilities of the intermediate device pertains to the portion of the data to be processed by the intermediate device. The method further includes transmitting the updated capability information to the source device, wherein the updated capability information is usable by the source device to generate the data.

In another aspect, this document features a device that includes a first port for receiving a connection from a destination device, at least one second port for receiving a connection from a source device, and circuitry for routing at least a portion of an output of the source device from the second port to the first port. The device also includes one or more processing devices configured to receive capability information indicative of media rendering capabilities of the destination device, and determine to process at least a portion of data received from the source device. Responsive to determining to process at least a portion of the data received from the source device, the one or more processing devices generate updated capability information to replace one or more media rendering capabilities of the destination device with corresponding one or more media rendering capabilities of the device, wherein the one or more media rendering capabilities of the device pertains to the portion of the data to be processed by the device. The device is also configured to transmit the updated capability information to the source device, wherein the updated capability information is usable by the source device to generate the data.

In another aspect, this document features one or more machine-readable storage devices having encoded thereon computer readable instructions for causing one or more processors of an intermediate device to perform various operations. The intermediate device is disposed between a source device and a destination device. The operations include receiving capability information indicative of media rendering capabilities of the destination device, and determining to process at the intermediate device at least a portion of data received from the source device. The opera- Implementations of the above aspects can include one or more of the following features.

A control profile associated with the source device may be accessed by the intermediate device, and at least a portion of the data received from the source device can be determined to be processed at the intermediate device based on the control profile. The control profile associated with the source device can indicate whether to process an audio portion of the data by the intermediate device or the destination device. The control profile associated with the source device can indicate whether to process a video portion of the data by the intermediate device or the destination device. The capability information indicative of the media rendering capabilities of the destination device can include one or more descriptive blocks arranged as a data structure. The one or more descriptive blocks can include at least one of an audio descriptive block and a video descriptive block. The capability information can be indicative of one or more of: a channel layout, a media format, and a codec available for decoding the data. Updating the capability information can include maintaining at least a portion of the capability information. The source device can be a media playing device or gaming device, and the destination device can be a media rendering device. The media rendering device can be one of: a television, a display device, or a projector. The intermediate device can be one of: an audio rendering device, a video rendering device, or a media rendering device. The destination device can be connected to the intermediate device by a high-definition multimedia interface (HDMI) connector. An audio portion of the data received from the source device can be rendered by the destination device and provided to the intermediate device via an audio return channel (ARC) of the HDMI connector. Generating the updated capability information can include maintaining information indicative of an audio rendering capability of the destination device as received as a portion of the media rendering capabilities of the destination device. An audio portion of the data received from the source device can be rendered by the intermediate device. Updating the capability information can include replacing information indicative of an audio rendering capability of the destination device by information indicative of an audio rendering capability of the intermediate device. The first port can be configured to receive a high-definition multimedia interface (HDMI) connector.

Various implementations described herein may provide one or more of the following advantages. An intermediate device disposed between a source device and a destination device can be configured to process data (e.g., audio data) generated by the source device based on contextual information about the source device. For example, if the source device (e.g., a BD player) is capable of generating audio data (e.g., 5.1 Dolby Pro Logic®) that is not supported by the destination device (but may be processed at the intermediate device), the intermediate device can be configured to extract the audio data from the stream received from the source device and pass on the remaining portion of the stream (e.g., including video data) to the destination device. On the other hand, if the source device generates audio data that may be processed by the destination device and returned to the intermediate device for rendering (e.g., via a return channel), the intermediate device can be configured to pass the entire data stream from the source device to the destination device. The intermediate device may be made aware of such contextual information about the source device via a dynamic mapping process of one or more source buttons of a remote controller of the intermediate device. This way, even though a same input port is used for connecting two different source devices to the intermediate device at two different times, the dynamic mapping of the source buttons on the remote can cause the intermediate device to process the data streams from the two devices in two different ways. In some cases, this may result in data being processed by the best available device to process such data, thereby enhancing the media experience resulting from the combination of the devices.

In some cases, contextual information about where a portion of the data is to be processed may also be used to request the source device to generate an appropriate type of data. For example, if the audio data generated by the source device is to be processed at a destination device that can only process two-channel audio (as opposed to, for example, 5.1 Dolby Pro Logic®), the intermediate device may ask the source device to provide two-channel audio data even if the source device is capable of providing audio data corresponding to 5.1 Dolby Pro Logic®. In some cases, this may result in the source device generating appropriate types of data, thereby reducing chances of audible or visual artifacts resulting from processing of incompatible types of data.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Figure 1A:
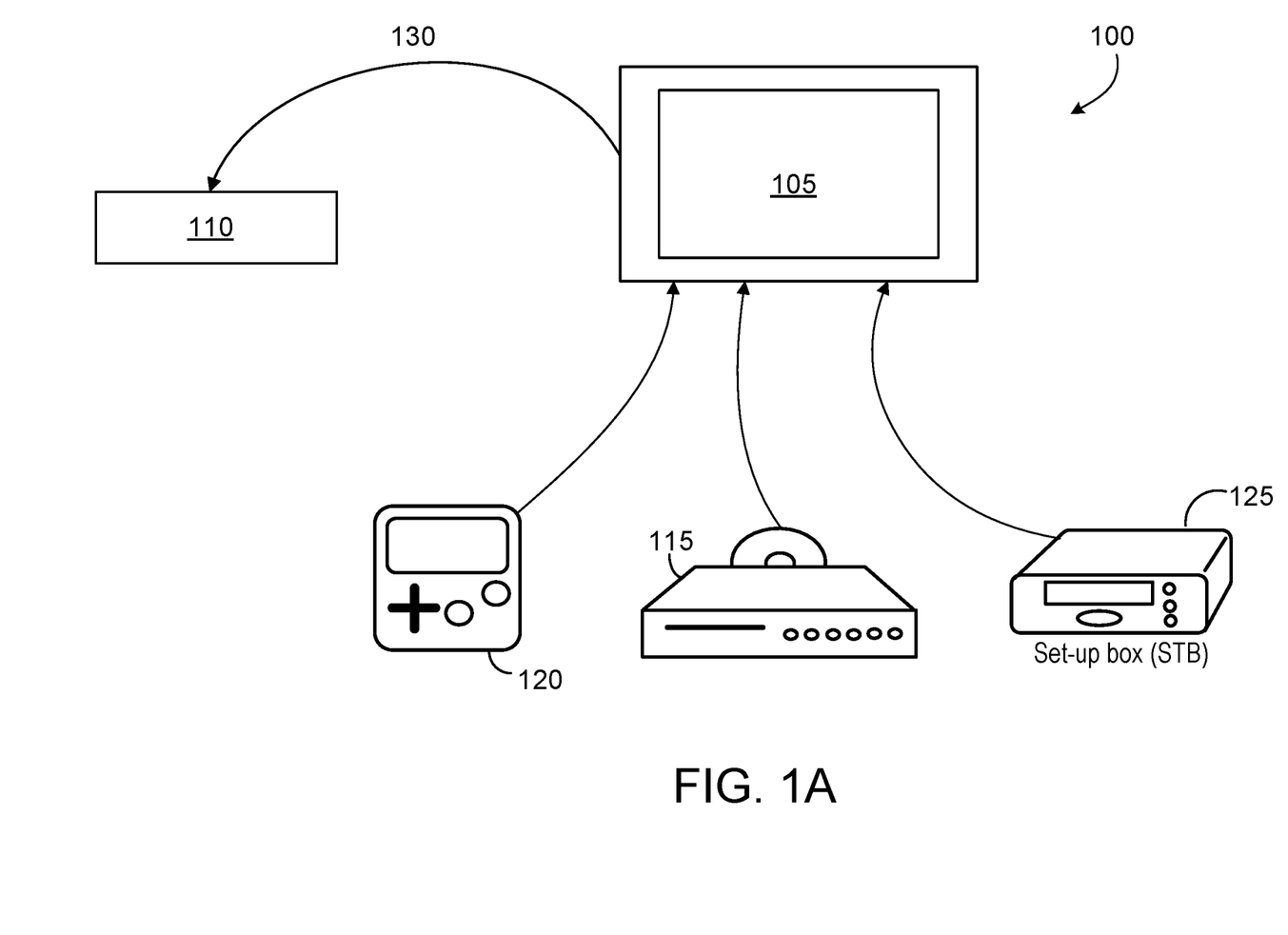
FIG. 1A is a block diagram of an example system where multiple source devices are connected to a TV, which in turn is connected to an acoustic device.
Figure 1B:
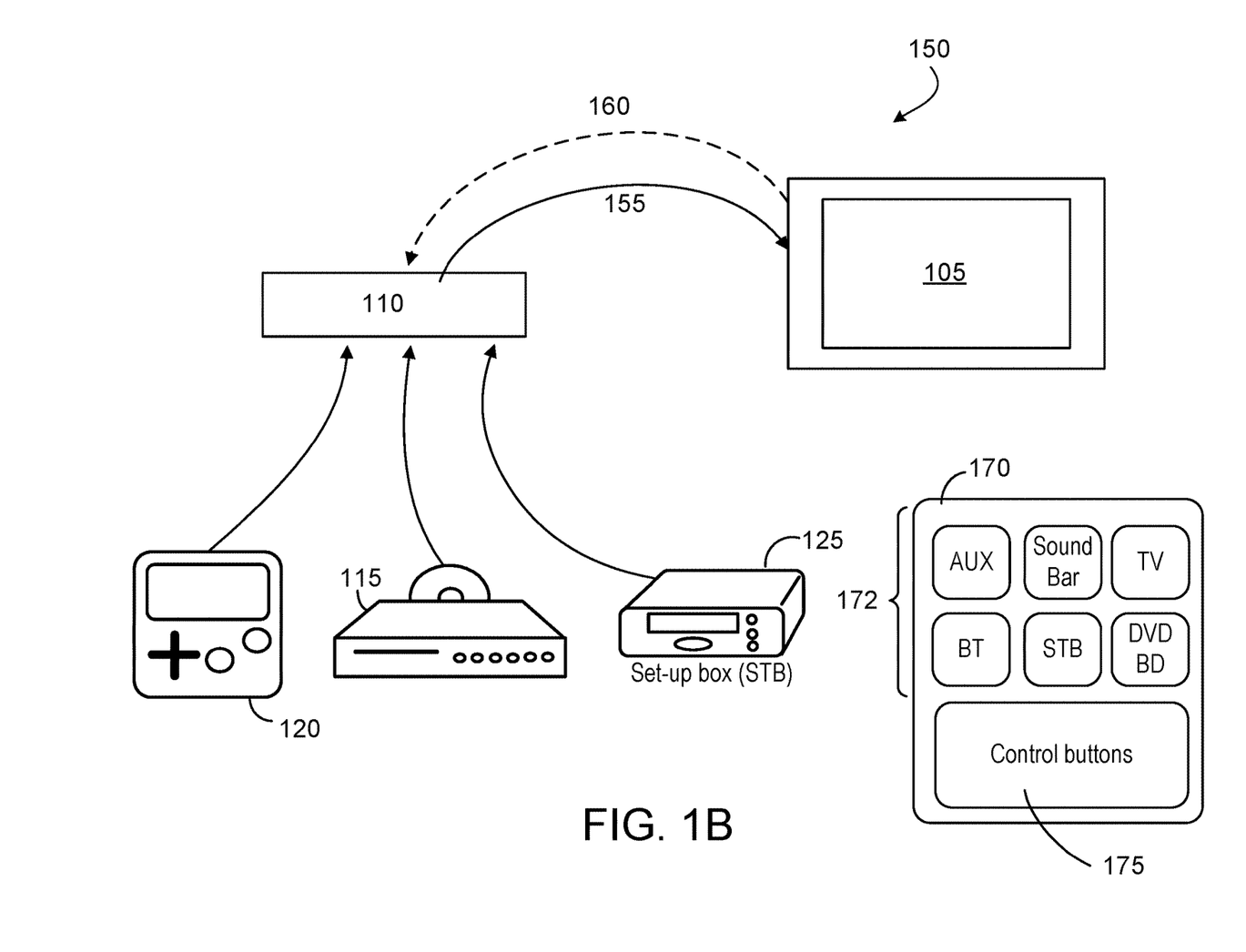
FIG. 1B is a block diagram of an example system where multiple source devices are connected to an acoustic device, which in turn is connected to a TV.

User experiences associated with TVs or other video devices such as projectors or other display devices may be enhanced via use of advanced acoustic devices such as sound bars or home theater systems (e.g., multiple speakers connected to an audio/video receiver (AVR) console). In some cases, the audio output port of a TV is connected to such an acoustic device which produces the enhanced acoustic output based on the audio data generated from the TV. FIG. 1A shows such a configuration 100, where a TV 105 is connected to an acoustic device 110. Multiple source devices such as a DVD/Blu-Ray Disc™ (DVD/BD) player 115, a game console 120, and a set-top-box (STB) 125 are connected to the TV 105. The TV 105 may be connected to the acoustic device 110 via a connector 130 such as an optical cable or a High Definition Multimedia Interface (HDMI) cable. In some cases, one or more source devices may be connected to an acoustic device 110 such as an AVR console. FIG. 1B shows such a configuration 150, where a TV 105 is connected to an acoustic device 110, and the multiple source devices are connected to the acoustic device 110.

When connected in a configuration such as the configuration 150 of FIG. 1B, the acoustic device 110 can be configured to receive a data stream (including audio/video data) via an HDMI input port from a connected source device, extract a portion of the data (e.g., audio content) from these forward-path streams, and retransmit the data stream over a forward channel 155 via an output HDMI output port to the TV 105. In some cases, the acoustic device 110 may also have the capability of receiving reverse-path audio stream(s) directly from the TV, via a return channel 160 such as a wired or wireless digital link or an HDMI-Audio Return Channel (HDMI-ARC).

Receiving the audio information from the forward path or the reverse path each has its own advantages and challenges. For example, when extracting audio in the forward path, the acoustic device 110 may extract the best available audio format (e.g., 5.1 surround sound rather than two channel stereo). However, because the TV 105 is downstream of the acoustic device 110, the extracted audio does not include any content generated by the TV 105, such as audible alerts or sounds (e.g., associated with selection menu items on the TV). Information about such content may therefore be transmitted to the acoustic device 110 over the return channel 160 and synchronized with the audio information extracted from the forward path. In addition, in order to render the audio in time-synchronized fashion with the video (e.g., to ensure lip sync), the acoustic device may require an associated delay information from the TV 105. This in turn may require buffer a portion of the extracted audio data prior to rendering.

On the other hand, when extracting audio in the reverse path, the acoustic device 110 receives the audio content generated by the source device synchronized with the audio content generated by the TV. In addition, because the audio and video content is synchronized at the output of most TVs, there is no additional burden imposed on the acoustic device 110 to delay the rendering of the audio. However, some TVs may be limited in the formats they can generate and deliver via the return channel 160. In addition, even if the TV is capable of generating an advanced audio format, the return channel 160 may not be capable of supporting such a format. For example, formats such as Dolby True HD®, DTS HD-Master®, and Multi-channel linear pulse code modulation (LPCM) having more than two channels are not supported by HDMI-ARC, even though these formats are supported in the forward HDMI path.

Therefore, in some cases, whether to extract the audio information from the forward path or the reverse path may depend on various types of contextual information. For example, if a source device connected to an acoustic device is capable of generating advanced audio data that may be processed at the acoustic device (but not by the TV), and the delay information is available from the TV, the acoustic device can be configured to extract the audio data from the forward path. On the other hand, if the source device generates audio data that may be processed by the TV and returned to the acoustic device for rendering (e.g., via a return channel), or if the source device is connected to the TV, the acoustic device may extract the audio data from the reverse path.

As shown in FIG. 1B, various source devices such as DVD players, Blu-Ray Disc™ (BD) players, streaming devices, and set-top boxes may be controlled using a controller device 170 such as a universal remote controller provided with the acoustic device 110. For example, the remote controller 170 may be programmed with appropriate codes associated with the various source devices, and activation of a source button 172 associated with a particular source device allows the remote controller to control the particular source device, for example, using the control buttons 175 of the remote controller 170. In such cases, one or more control elements associated with a particular source device may be hard-wired to a selection of a physical input port of the acoustic system using a corresponding source button 172. For instance, in the example of FIG. 1B, selection or activation of the "TV" button can correspond to extracting audio information from the return channel 160 of the connection to the TV. Likewise, selection of the "DVD/BD" button can correspond to extracting audio information from a forward path of the data stream coming in from the DVD/BD player 115 connected to a corresponding input port.

However, such hard-wired processing (which may also be referred to as static routing and control) may not be advantageous in some cases. For example, when a source device is not directly attached as an input port of the acoustic device, the corresponding source button 172 on the remote controller cannot be selected. For example, unless a source device is attached to the auxiliary input port of the acoustic device, the "AUX" button on the remote control cannot be used to select any source device. In some cases, where the acoustic device does not have a large number of input ports (e.g., due to form factor or design issues), only the corresponding few source buttons 172 on the remote controller are usable. For example, if the acoustic system only has one HDMI input port that has a set-top-box connected, all source buttons 172 except the "STB" button may be rendered non-functional. In addition, in hard-wired processing, incoming data streams are processed based upon the physical connections. For example, if the "TV" button corresponds to extracting the audio from the reverse path on the respective input port, data from any other source device connected to that input port would be processed in that way, even if better quality audio is available in the forward path.

This document describes technology that may allow for associating source buttons 172 on a remote device to an acoustic device such that the acoustic device processes incoming data through an input port in accordance with the source device connected to the input port. This in turn may allow for avoiding hard-wired associations between source buttons 172 and input ports, thereby allowing for fewer input ports on the acoustic device. The technology may therefore facilitate design and implementation of acoustic devices with a small number of input ports, and correspondingly small form factors, without sacrificing the flexibility of connecting various source devices and controlling them with a universal remote controller.

Figure 2A:
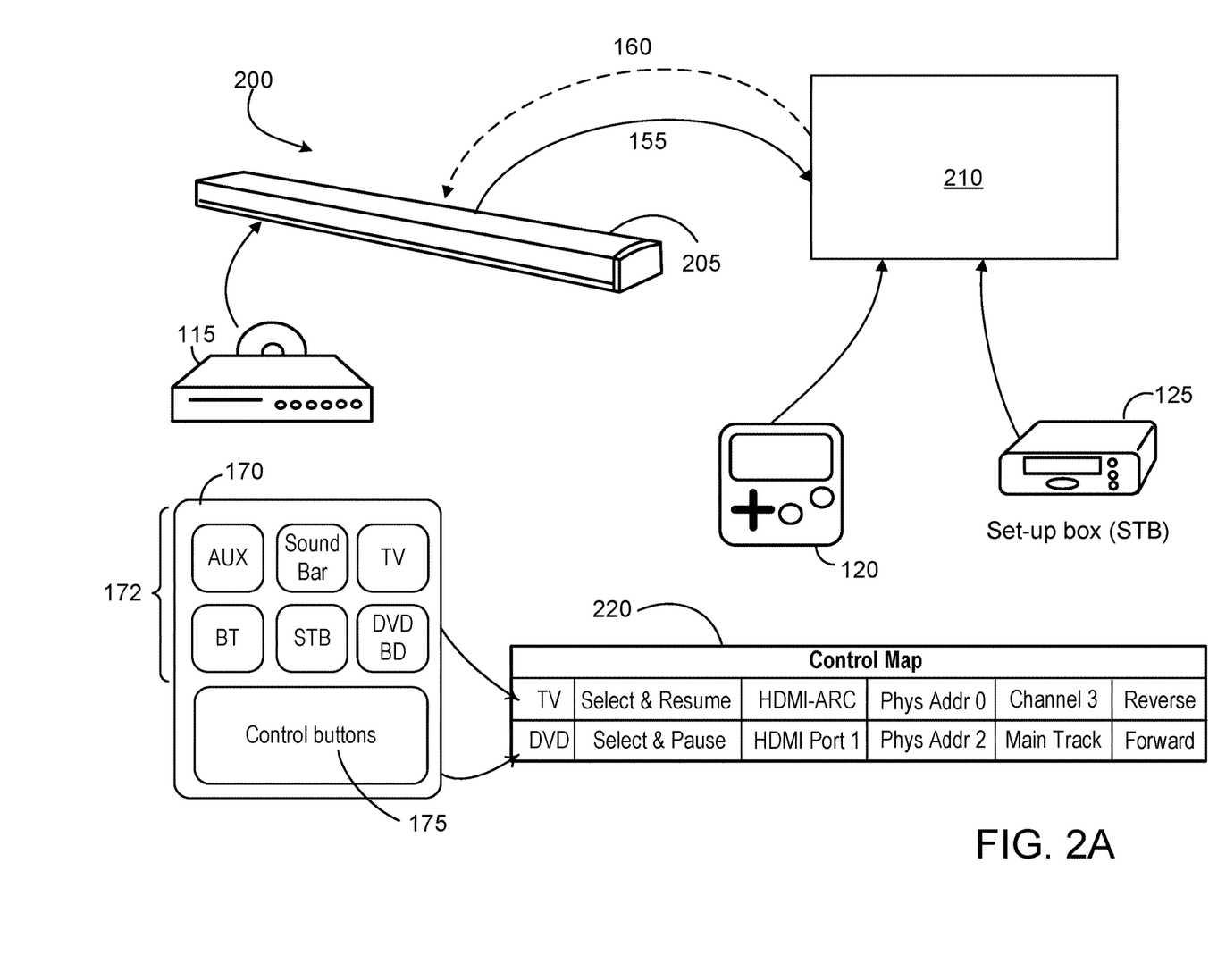
FIGS. 2A-2B are each a block diagram of an example system where one or more source devices are connected to an intermediate device, and the intermediate device is also connected to a destination device.
Figure 2B:
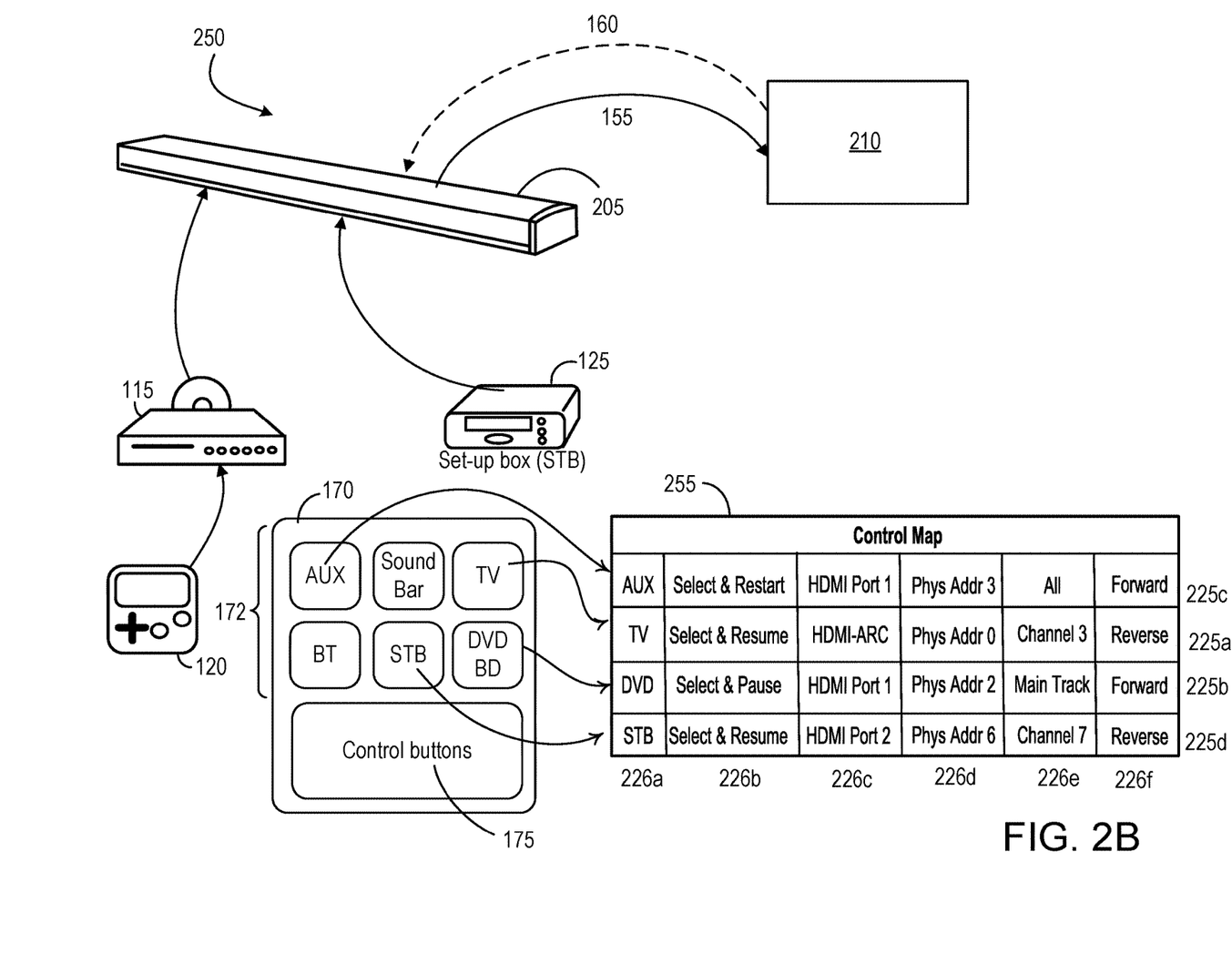

FIGS. 2A and 2B show examples of systems implementing technology described herein. Specifically, FIG. 2A shows an example of a configuration 200 where an acoustic device 205 is disposed between a destination device 210 and a source device (a DVD/BD player 115, in this particular example). Examples of a destination device can include a TV 105, or other audio/visual devices such as a projector, another display device, or another audio/visual device connected to the acoustic device 205 to render at least a portion of the signals generated by a source device. In some cases, a destination device may also be referred to as a sink device. Because in some configurations, the acoustic device 205 is disposed between at least one source device and at least one destination device 210, the acoustic device 205 may also be interchangeably referred to as an intermediate device. In some implementations, one or more source devices (e.g., the game console 120 and the STB 125) are directly connected to the destination device 210.

In some implementations, the technology described herein may be used to address the above-mentioned challenges associated with static routing and control. For example, the technology may provide the flexibility of dynamically configuring how a data stream is processed by the intermediate device 205, for example, based on which source button is selected on a remote controller 170.

While the examples herein refer to the remote controller 170 as a physical device, the functionalities of the remote controller may also be implemented using an application executing on a mobile device or TV. As such, the remote controller 170 may be interchangeably referred to herein as a control device, and the source buttons 172 and control buttons 175 on the remote controller 170 may interchangeably be referred to as control elements.

In some implementations, the above-mentioned flexibility can be provided via the use of a data structure 220 that represents a control map or control profile, and maps various control elements on the user's control device to a set of control parameters for the intermediate device 205. For example, the source buttons 172 of a remote controller 170 (or menu items on a mobile application) can be mapped to the data structure 220 that is indicative of one or more control parameters. The control parameters may be processed by the intermediate device 205 to carry out various operations. Examples of such operations include selection of one of the physical input ports of the intermediate device 205, selection of a source device (which may not be directly attached to the intermediate device 205) either upstream or downstream of the intermediate device, selection of a portion of a data stream (e.g., an audio portion included in the data stream) in either a forward or a reverse path, and execution of a control function (e.g., pausing or stopping playback) on a particular data stream or source device, such as pausing or stopping audio playback.

In some implementations, an entry (e.g., 225a, 225B etc., 225 in general) in the data structure 220 may include one or more fields (226a, 226b, etc., 226 in general) that specify how the intermediate device 205 should be configured upon selection of a particular control element on the control device. For example, a field 226 can specify a control element (e.g., a particular source button 172 or control button 175 or a user-interface element presented on a display device) for performing a specific control function. The specific control function to be performed upon activation of the corresponding control element may be specified using another field 226*b*. Examples of such control functions include a control operation on a particular device or a particular portion of a data stream, such as selection of a particular input port, or pausing the audio portion of the data stream from a particular input port. In some implementations, the input port to be associated with the control element can be specified using a field 226*c*. In the example shown in FIG. 2A, the control element "TV" (as represented by the entry 225*a*) is associated with the HDMI-ARC port (i.e., the reverse path input port from the TV to the intermediate device) via the corresponding field 226*c*, and the control element "DVD/BD" (as represented by the entry 225*b*) is associated with HDMI Port 1 of the acoustic device 205 via the corresponding field 226*c*. In some implementations, a field 226*d* may be used to specify whether the corresponding source device is directly or indirectly connected. For example, the field 226*d* can be used to specify an HDMI device address on a local HDMI network, the HDMI device address specifying where the source device is connected.

In some implementations, a field 226*f* may be used to specify how the intermediate device 205 is to process a data stream from a source device. For example, the field 226*f* may be used to specify whether an audio portion of the data stream is to be extracted from the forward or the reverse path. In the example of FIG. 2A, the field 226*f* in the entry 225*a* specifies that the audio is to be extracted from the reverse path when the control element "TV" is selected, and the field 226*f* in the entry 225*b* specifies that the audio is to be extracted from the forward path when the control element "DVD/BD" is selected.

In some implementations, the data structure 220 can be stored on a storage device accessible by the acoustic device 205, and retrieved upon receipt of information indicative of user-selection that identifies a particular button (or other control element) of a corresponding control device. For example, when a particular control element is activated (for example, via pressing of a source button 172 of a remote controller 170), the intermediate device 205 can refer to the control profile represented by the data structure 220 and configure itself in accordance with the entry 225 associated with the particular control element. The intermediate device 205 can then perform various control functions on the associated input source device.

In the particular example shown in FIG. 2A, when a user selects the "DVD/BD" button on the remote controller 170, the intermediate device 205 accesses the data structure 220 in response, and based on the information therein, instructs the BD player 115 to play the main track of the Blu-Ray® disc (as specified, for example, a field 226*e* of the entry 225) and pause playback until the user presses another button to resume the playback. When playback is resumed, a data stream (including the audio/video content) is provided by the Blu-Ray player to the intermediate device 205 on HDMI Port 1, and the intermediate device 205 extracts the audio content from the data stream in the forward path to deliver the audio through the speakers of the intermediate device 205. In a second example illustrated in FIG. 2A, when the user presses the "TV" button on the remote controller 170, the intermediate device 205 accesses the data structure 220, and based on the information therein, instructs the TV to turn on (e.g., if the TV is in standby mode) and play the live program on Channel 3 (as specified, for example, by the field 226*e* of the entry 225*a*). As the TV presents the corresponding audio to the intermediate device via the return channel 160 (e.g., HDMI-ARC), the intermediate device 205 extracts the audio from the corresponding port on the reverse path and delivers the audio via the speakers of the intermediate device 205.

FIG. 2B illustrates use of dynamic routing and control in a more complex configuration 250 (as compared to the configuration 200 of FIG. 2A). In this example, in addition to behaving as an HDMI source, the BD player 115 also includes HDMI pass-through capability which allows the BD player 115 to act as a router in the connection path between the game console 120 and the intermediate device 205. Also, in this example, the intermediate device 205 includes two input ports (e.g., HDMI input ports) that are connected to the BD player 115 and a STB 125, respectively. In the configuration of FIG. 2B, the source buttons "DVD/BD" and "TV" can function substantially in the same way as described with respect to FIG. 2A. In addition, when the user presses the "AUX" button on the remote controller 170, the intermediate device 205 (based on information available in the data structure 255) can be configured to recognize the associated source device to be the game console 120 (e.g., based on the address provided in the field 226*d* of the entry 225*c*), and accordingly instruct the game console 120 to be restarted. Upon receiving a resulting data stream from the game console 120 through the BD player 115, the intermediate device 205 extracts the audio in the forward path as specified in the entry 225*c* of the data structure 255. In another example, when the user presses the "STB" button of the remote controller 170, the intermediate device 205 instructs the STB to resume the program on Channel 7. As a corresponding data stream is received by the intermediate device 205 via a corresponding port (e.g., HDMI port 2 in this example), the intermediate device 205 passes the data stream (including all audio and video content) to the TV and extracts the audio from the TV on the reverse path.

The data structures 220 and 255 shown in FIGS. 2A and 2B are examples of control profiles that may be used for configuring an intermediate device 205 in accordance with selections of different control elements on a controller device 170. The control profiles can be of various other forms and can include more, less, and/or different contents than that shown for the data structures 220 and 255. In some implementations, the portion of the data stream to be extracted may be specified using a separate field. For example, such a field can be used to specify which portion of the data stream (e.g., a particular channel of audio data, the video portion etc.) is to be extracted/processed by the intermediate device 205. In some implementations, various other configuration parameters can be included in the entries 225 of the data structures. In some implementations, the entries within a control profile may have different number of fields, different field types, field lengths, etc. For example, an entry for the control element "TV" may have fewer (or more) fields than the entry for the control element "DVD/BD".

In some implementations, the control profiles (e.g., the data structures 220 and 255 illustrated in FIGS. 2A and 2B, respectively) can be user-configurable. For example, the control profiles may be configured via an application executing on a mobile device or computing device that can communicate the information to a corresponding intermediate device 205. In some implementations, the control profiles may also be configured using a user-interface generated by the intermediate device 205. Such a user interface can be presented, for example, on a display device of the intermediate device 205 or on a destination device 210 such as a TV. In some implementations, this may allow different users to personalize the control profiles. For example, if a user wants to connect a second streaming device instead of an STB, the user may configure the entry associated with the control element "STB" to include control parameters suitable for processing data from a streaming device.

Figure 3:
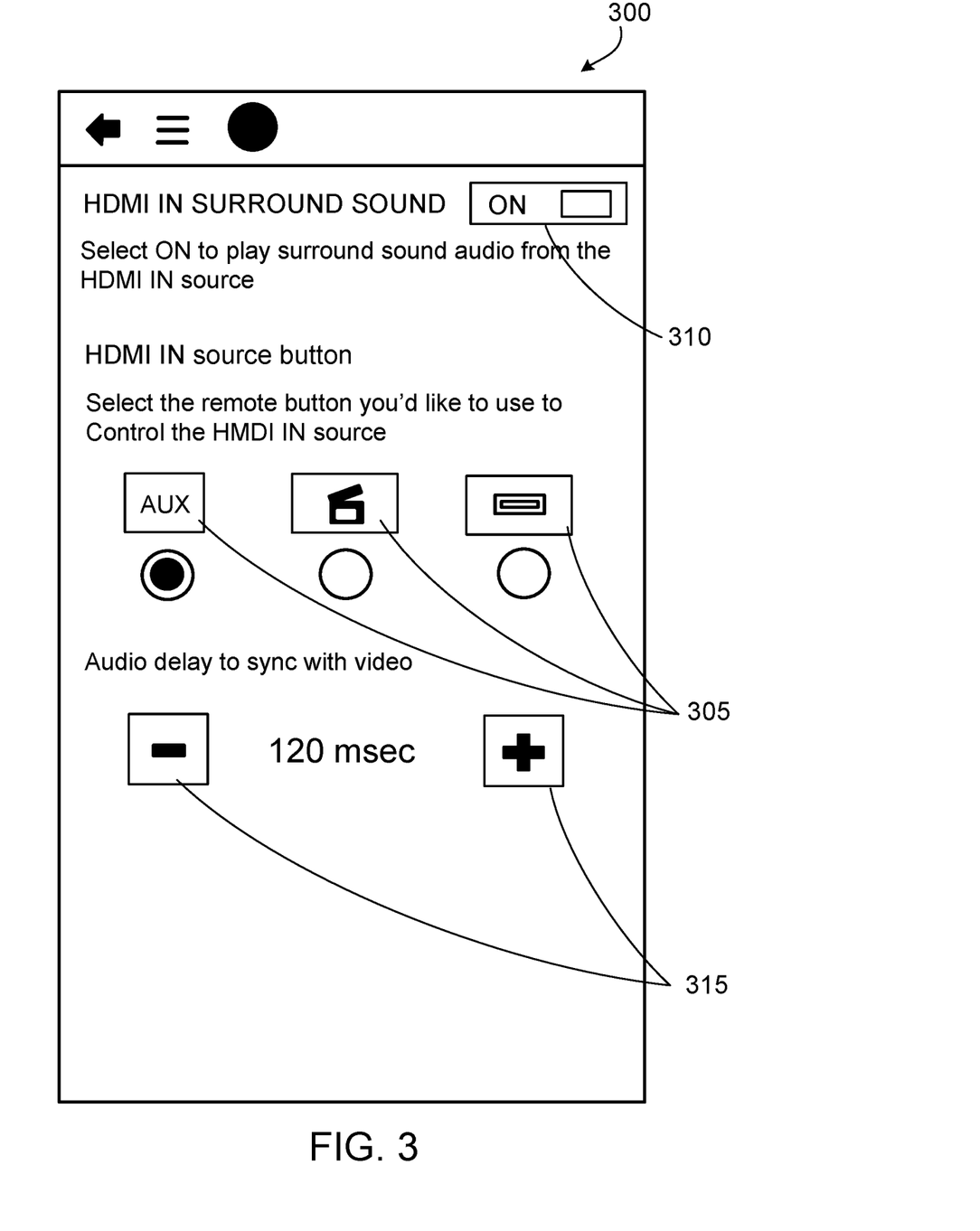
FIG. 3 is an example of a user-interface usable for mapping and configuring a control element of a control device.

FIG. 3 is an example of a user-interface 300 usable for mapping and configuring a control element of a control device. In some implementations, the user-interface 300 can be presented on a mobile device (e.g., a smartphone or tablet computer) by an application executing on the mobile device. The application can be configured to cause the mobile device to communicate the configuration information to an intermediate device and/or a controller device such as a remote controller. In some implementations, the user-interface 300 can include a control 305 for selecting one or more of the control elements (e.g., remote controller buttons) to be configured. The user-interface 300 can also include various controls for configuring the selected control elements. For example, the user-interface 300 can include a control 310 for enabling surround sound for the selected control element. Enabling this control can cause, for example, the intermediate device to extract the audio portion of the data stream coming from the corresponding source device in the forward path (where available) and generate the corresponding acoustic output through the speakers of the intermediate device. In some implementations, the user-interface 300 can also include one or more controls 315 for adjusting a delay to synchronize the audio output with the corresponding video output. For example, if the audio portion of the data is extracted in the forward path and rendered at the intermediate device, the rendering of the audio may have to be delayed by a time period to account for the processing delay resulting from a destination device receiving and rendering the corresponding video. This delay may be adjusted by the user using the one or more controls 315. Other controls not shown in the example of FIG. 3 may also be used for configuring the control elements. For example, the user-interface 300 can include controls for adjusting/configuring one or more of the parameters specified using the various fields of the control profiles.

Figure 4:
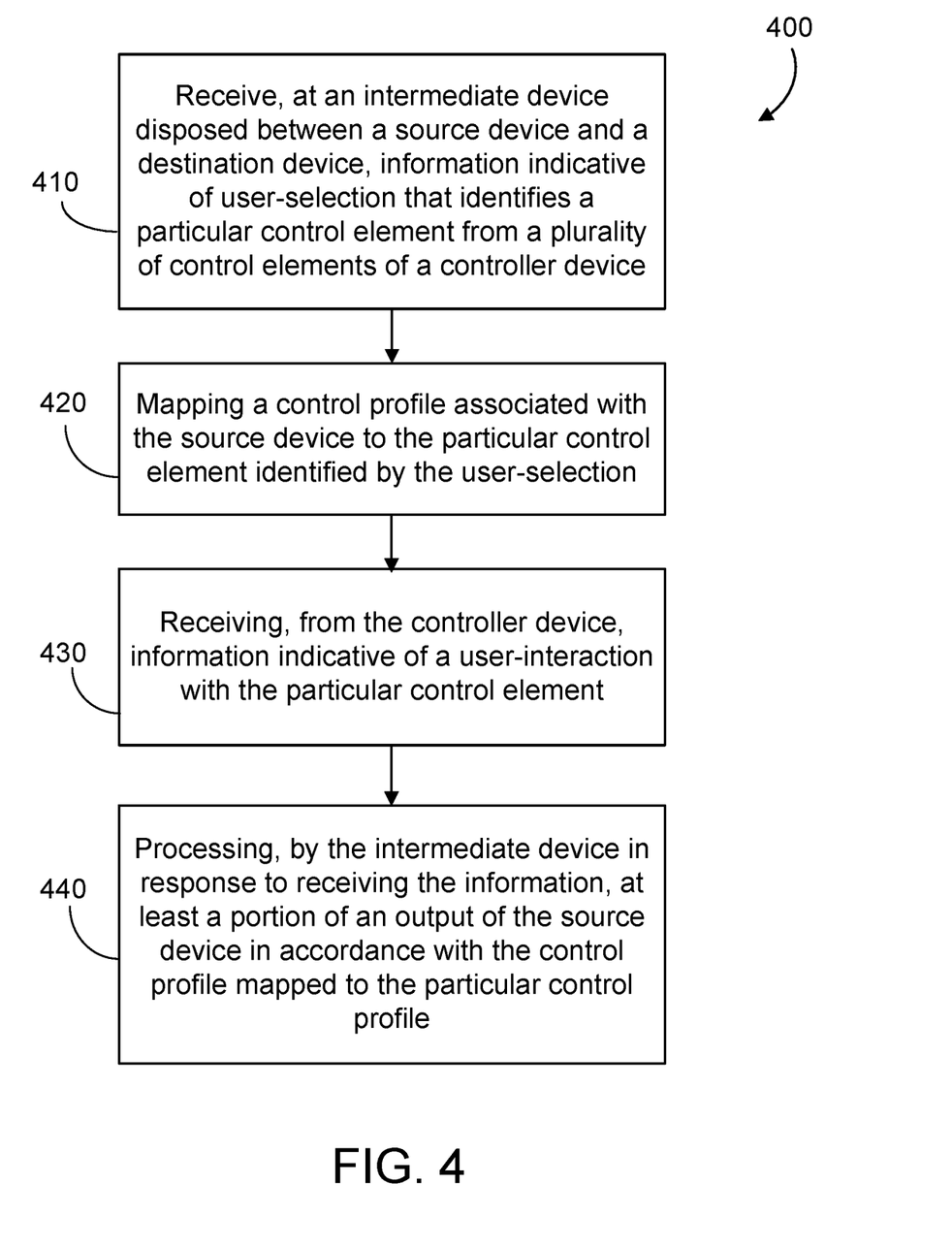
FIG. 4 is a flowchart of an example process for processing at least a portion of an output of a source device in accordance with a control profile mapped to a particular control element of a control device.

FIG. 4 is a flowchart of an example process 400 for processing at least a portion of an output of a source device in accordance with a control profile mapped to a particular control element of a control device. At least a portion of the operations of the process 400 can be performed by one or more processing devices (e.g., a controller, a microprocessor, or a digital signal processor (DSP)) disposed in an acoustic device such as the intermediate device 205 described above. Operations of the process 400 includes receiving, at an intermediate device disposed between a source device and a destination device, information indicative of user-selection that identifies a particular control element from a plurality of control elements of a controller device (410). Each of the plurality of control elements can be selectable as the particular control element to be associated with the source device. In some implementations, the controller device is a remote controller associated with the intermediate device. In such cases, the plurality of control elements includes multiple buttons (e.g., the source buttons 172 described above) of a remote controller. The source device can be a media playing device, gaming device, etc. such as a DVD/BD player, a streaming device, an STB box, or a game console. The destination device can be an audio/video rendering device such as a TV, projector, or another display device. The intermediate device can include, for example, an audio rendering device, a video rendering device, or an audio/video rendering device. In some implementations, the intermediate device is a sound-bar that may be connected to a TV.

Operations of the process 400 also include mapping a control profile to the particular control element identified by the user-selection (420). This may be done, for example, using one or more data structures (e.g., the data structures 220 and 255 described above) including a representation of the control profile. In some implementations, the control profile can be selected responsive to receiving, from the source device, information indicative of an audio output capability of the source device. For example, if the source device indicates to the intermediate device that the source device is capable of generating 5.1 Dolby Pro Logic®, but the corresponding destination device is not capable of rendering the same, the intermediate device can be configured to select a control profile that specifies extracting the audio from the forward path. In some implementations, the intermediate device can be configured to also select a control profile that specifies extracting the audio from the forward path if the destination device is capable of rendering the audio format generated by the source device, but the return channel (e.g., the return channel 160 described above) between the destination device and the intermediate device is incapable of supporting the rendered audio. In another example, if the source device is capable of generating an audio format that may be rendered by the corresponding destination device, the intermediate device can be configured to select a control profile that specifies extracting the audio from the reverse path.

Operations of the process 400 further include receiving, from the controller device, information indicative of a user-interaction with the particular control element (430). Operations of the process 400 can also include processing, by the intermediate device, at least a portion of an output of the source device in accordance with the control profile mapped to the particular control element (440). The processing can be triggered responsive to receiving the information indicative of the user-interaction of the particular control element. The output of the source device can include an audio portion and a video portion, and the intermediate device can be configured to render the audio portion of the output of the source device. In some implementations, the control profile can indicate that a representation of the audio portion is to be extracted by the intermediate device from the output of the source device in the forward path. Processing the portion of the output of the source device in accordance with the control profile can include extracting the audio portion from the output of the source device, and forwarding a portion of the output to the destination device. The portion forwarded to the destination device can include the video portion, which is to be rendered by the destination device. In some implementations, the intermediate device receives delay information indicative of a video processing latency associated with a rendering of the video portion on the destination device, and reproduces the audio portion in accordance with the delay information. The delay information may be received from the destination device rendering the video portion.

In some implementations, the control profiles may also be automatically configured by the intermediate device, for example, through discovery of various associations between control elements, control functions, input ports, audio streams, and path. Such associations may be generally referred to as contextual information. Referring again to FIG. 2A, the intermediate device 205 may receive capability information indicative of media rendering capabilities of the destination device. For example, the intermediate device 205 may receive information on the TV model and the ARC capabilities in the form of a data structure such as an Extended Display Identification Data (EDID) data structure or an Enhanced Extended Display Identification Data (E-EDID) data structure. Such data structures may be communicated from the destination device to the intermediate device 205, for example, via Consumer Electronic Control (CEC) messaging over a HDMI connector. In another example, the intermediate device 205 can be configured to receive information representing the media rendering capabilities of the BD player (e.g., information representing model number, audio format capabilities, video format capabilities etc.), for example, via a data structure such as the CEC-Infoframe structure. In some implementations, the intermediate device can be configured to use the received information to dynamically modify/update the capability information received from the destination device before transmitting (or advertising) the capability information to the source device.

In some implementations, dynamically updating the capability information of the destination device based on contextual information may provide an enhanced media experience. For example, a destination device such as a TV may be capable of rendering only two channel pulse code modulation (PCM) audio, and not a more advanced 5.1 surround sound format generated by a source device (e.g., a BD player). If the intermediate device is capable of rendering the more advanced audio format, the intermediate device may be configured to update the capability information received from the destination device to replace the identification of two-channel PCM audio with an identification of the advanced audio format supported by the intermediate device. In another example, the contextual information may indicate that the audio is being rendered at the destination device and the intermediate device is extracting the audio from the reverse path. If the destination device is only capable of rendering two-channel audio, providing an advanced 5.1 surround sound format may be redundant or even produce undesirable artifacts due to inadequate processing capabilities of the destination device. In such a case, excluding the audio capabilities of the intermediate device (and retaining the corresponding capabilities of the destination device) in the updated capability information advertised to the source device can allow the source device to generate a suitable data stream for the given set of contextual information. By allowing the use of contextual information (e.g., as specified via the control profiles) in updating the capability information advertised to the source device, the technology described herein may improve the media experience for a given set of contextual information.

Figure 5:
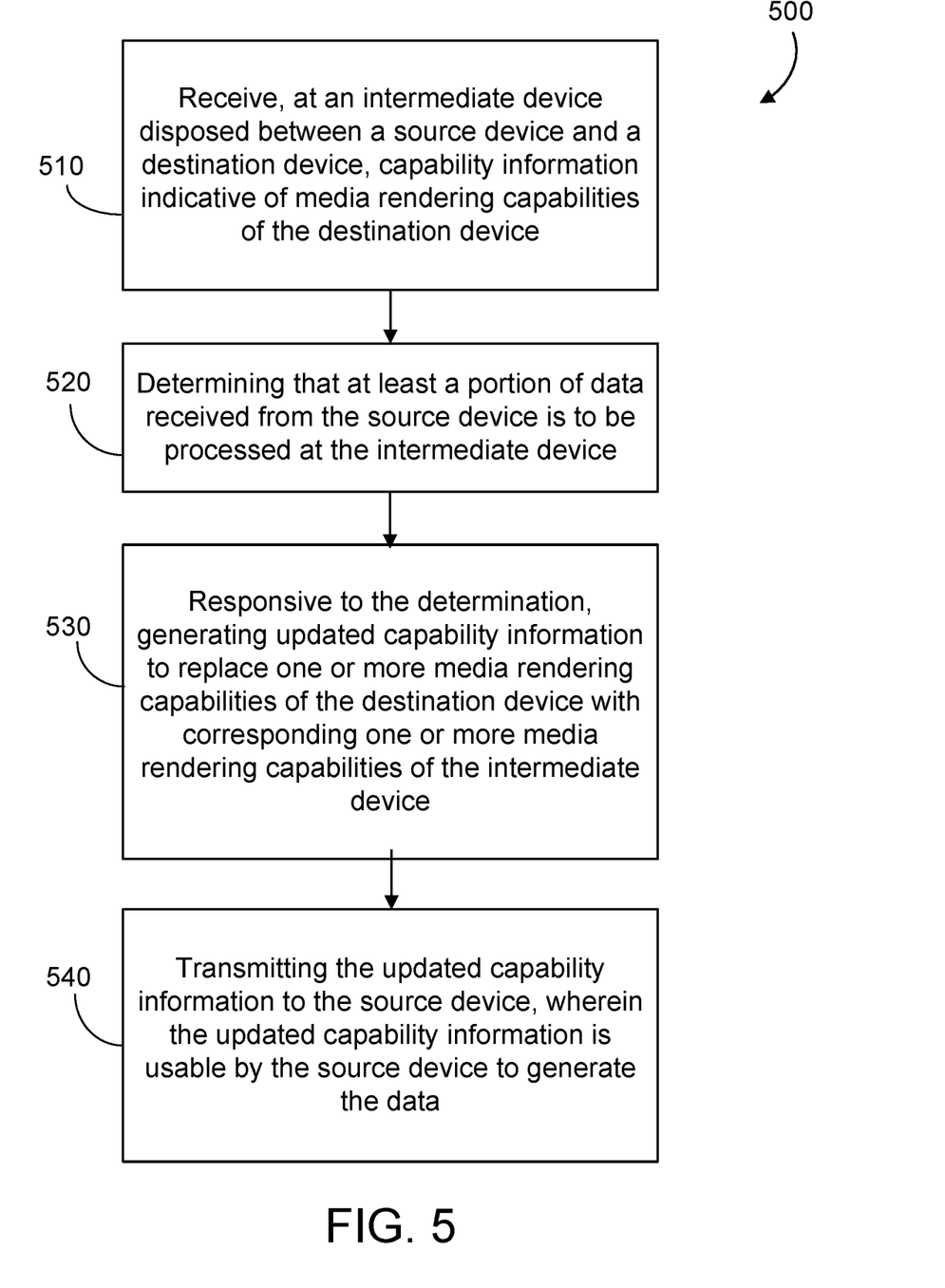
FIG. 5 is a flowchart of an example process for transmitting, from an intermediate device, capability information usable by a source device to generate a data stream.

FIG. 5 is a flowchart of an example process for transmitting, from an intermediate device, capability information usable by a source device to generate a data stream. At least a portion of the operations of the process 400 can be performed by one or more processing devices (e.g., a controller, a microprocessor, or a digital signal processor (DSP)) disposed in an acoustic device such as the intermediate device 205 described above. Operations of the process 500 includes receiving, at an intermediate device disposed between a source device and a destination device, capability information indicative of media rendering capabilities of the destination device (510). The capability information indicative of the media rendering capabilities of the destination device can include one or more descriptive blocks arranged as a data structure. The capability information can include information of audio rendering capabilities and/or video rendering capabilities. For example, the capability information is indicative of one or more of: a channel layout, a media format, and a codec available for decoding the data generated by the source device. In some implementations, the one or more descriptive blocks can include at least one of an audio descriptive block and a video descriptive block.

In some implementations, the descriptive blocks may be provided as an E-EDID structure (as specified by the Video Electronics Standards Association (VESA)), and include, for example, information on manufacturer, model, serial number, and/or software version associated with the destination device. The descriptive block can also include information on product capability, including, for example, number of audio outputs, number of inputs, supported display formats, and/or video display timing information. The descriptive block may also include information on extensions (e.g., as specified in the CEA-861 set of standards), including, for example, monitor name, short descriptors of video formats (e.g., 1080p, 1080i, etc.), short descriptors of audio formats, max number of channels, and/or speaker allocation information indicative of which channels are used and mapped to which locations. In some implementations, the descriptive blocks may also include vendor-specific proprietary information shared between devices.

Operations of the process 500 also include determining, that at least a portion of data received from the source device is to be processed at the intermediate device (520). This can include, for example, accessing a control profile associated with the source device, and determining, based on the control profile, that at least a portion of the data received from the source device is to be processed at the intermediate device. In some implementations, the control profile associated with the source device indicates whether an audio portion of the data is to be processed by the intermediate device or the destination device. In some implementations, the control profile may indicate whether a video portion of the data is to be processed by the intermediate device or the destination device.

Operations of the process 500 further include generating updated capability information to replace one or more media rendering capabilities of the destination device with corresponding one or more media rendering capabilities of the intermediate device (530). The one or more media rendering capabilities of the intermediate device pertains to the portion of the data to be processed by the intermediate device. The updated capability information may be generated, for example, responsive to determining that at least a portion of the data received from the source device is to be processed at the intermediate device. In some implementations, updating the capability information can include maintaining at least a portion of the capability information. For example, the destination device can be connected to the intermediate device by a high-definition multimedia interface (HDMI) connector, wherein an audio portion of the data received from the source device is rendered by the destination device and provided to the intermediate device via an audio return channel (ARC) of the HDMI connector. In such cases, generating the updated capability information can include maintaining information indicative of an audio rendering capability of the destination device as received as a portion of the media rendering capabilities of the destination device. In some implementations, an audio portion of the data received from the source device is rendered by the intermediate device. In such cases, updating the capability information can include replacing information indicative of an audio rendering capability of the destination device by information indicative of an audio rendering capability of the intermediate device.

Operations of the process 500 also include transmitting the updated capability information to the source device, wherein the updated capability information is usable by the source device to generate the data (540). The source device can be a media playing device or gaming device, and the destination device can be a media rendering device such as a television, projector, or another display device. The source device may use the updated capability information to generate a data stream, including audio/video information, in accordance with the information included within the updated capability information. For example, if the updated capability information specifies a particular audio format and a particular video format, the source device may generate a data stream that includes the audio and video information in the particular audio format and the particular video format, respectively.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. For example, the specification describes most of the examples with reference to extracting audio data from the forward or reverse path. However, in some implementations, video data may also be extracted from the data stream provided by a source device. For example, if the intermediate device includes an advanced video codec not available in the destination device, the intermediate device may update the capability information of the destination device to indicate availability of the advanced codec. In such cases, the intermediate device may extract the video data from the forward path to decode the video at the intermediate device, and provide the decoded data to the destination device for presentation.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:
    receiving, at an intermediate device disposed between a source device and a destination device, information indicative of media rendering capabilities of the destination device;
    accessing a control profile associated with the source device, wherein the control profile includes information on media rendering capabilities of the source device;
    determining whether at least a portion of data received from the source device is to be (a) processed at the intermediate device or (b) processed at the destination device and extracted in reverse path by the intermediate device, the determination being based on (i) identifying, from the control profile, that the source device is capable of generating a particular audio format and/or video format, and (ii) determining, from the media rendering capabilities of the destination device, whether the destination device is incapable of processing the particular audio format and/or video format;
    responsive to a determination that at least the portion of the data received from the source device is to be processed at the intermediate device, generating updated capability information to replace at least a portion of the media rendering capabilities of the destination device with information indicative of the particular audio format and/or video format of the intermediate device;
    responsive to a determination that at least the portion of the data received from the source device is to be processed at the destination device and extracted in the reverse path by the intermediate device, excluding corresponding media rendering capabilities of the intermediate device from the updated capability information; and
    transmitting the updated capability information to the source device, wherein the updated capability information is used by the source device to generate the data.

2. The method of claim 1, wherein the control profile associated with the source device indicates whether to process an audio portion of the data by the intermediate device or the destination device.

3. The method of claim 1, wherein the control profile associated with the source device indicates whether to process a video portion of the data by the intermediate device or the destination device.

4. The method of claim 1, wherein the information indicative of the media rendering capabilities of the destination device includes one or more descriptive blocks arranged as a data structure.

5. The method of claim 4, wherein the one or more descriptive blocks include at least one of an audio descriptive block and a video descriptive block.

6. The method of claim 1, wherein updating the information comprises maintaining at least a portion of the information.

7. The method of claim 1, wherein the source device is a media playing device or gaming device, and the destination device is a media rendering device.

8. The method of claim 7, wherein the media rendering device is one of: a television, a display device, or a projector.

9. The method of claim 1, wherein the intermediate device is one of: an audio rendering device, a video rendering device, or a media rendering device.

10. The method of claim 1, wherein the destination device is connected to the intermediate device by a high-definition multimedia interface (HDMI) connector.

11. The method of claim 10, wherein an audio portion of the data received from the source device is rendered by the destination device and provided to the intermediate device via an audio return channel (ARC) of the HDMI connector.

12. The method of claim 11, wherein generating the updated information comprises maintaining information indicative of the audio format of the destination device as received as a portion of the media rendering capabilities of the destination device.

13. The method of claim 1, wherein an audio portion of the data received from the source device is rendered by the intermediate device.

14. An electronic device comprising:
a first port for receiving a connection from a destination device;
at least one second port for receiving a connection from a source device;
circuitry for routing at least a portion of an output of the source device from the second port to the first port;
and one or more processing devices configured to:
receive information indicative of media rendering capabilities of the destination device, the media rendering capabilities including at least one of: an audio format and a video format,
access a control profile associated with the source device, wherein the control profile includes information on media rendering capabilities of the source device,
determine whether (a) to process at least a portion of data received from the source device, or (b) extract, from a reverse path, information corresponding to the portion of the data, as processed by the destination device, the determination being based on (i) identifying, from the control profile, that the source device is capable of generating a particular audio format and/or video format, and (ii) determining, from the media rendering capabilities of the destination device, whether the destination device is incapable of processing the particular audio format and/or video format,
responsive to a determination to process at least the portion of the data received from the source device, generate updated capability information to replace at least a portion of the media rendering capabilities of the destination device with information indicative of the particular audio format and/or video format of the device,
responsive to a determination that at least the portion of the data received from the source device is to be processed at the destination device and extracted in the reverse path, excluding corresponding media rendering capabilities of the electronic device from the updated capability information, and transmit the updated capability information to the source device, wherein the updated capability information is used by the source device to generate the data.

15. The electronic device of claim 14, wherein the control profile associated with the source device indicates whether to process an audio portion of the data by the device or the destination device.

16. The electronic device of claim 14, wherein the control profile associated with the source device indicates whether to process a video portion of the data by the device or the destination device.

17. The electronic device of claim 14, wherein the information indicative of the media rendering capabilities of the destination device includes one or more descriptive blocks arranged as a data structure.

18. The electronic device of claim 17, wherein the one or more descriptive blocks include at least one of an audio descriptive block and a video descriptive block.

19. The electronic device of claim 14, further configured to update the information by maintaining at least a portion of the information.

20. The electronic device of claim 14, wherein the source device is a media playing device or gaming device, and the destination device is a media rendering device.

21. The electronic device of claim 14, wherein the first port is configured to receive a high-definition multimedia interface (HDMI) connector.

22. The electronic device of claim 21, wherein an audio portion of the data received from the source device is rendered by the destination device and provided to the device via an audio return channel (ARC) of the HDMI connector.

23. The electronic device of claim 14, further configured to generate the updated information by maintaining information indicative of the audio format of the destination device as received as a portion of the media rendering capabilities of the destination device.

24. The electronic device of claim 14, configured to render an audio portion of the data received from the source device.

25. One or more machine-readable storage devices having encoded thereon computer readable instructions for causing one or more processors of an intermediate device, disposed between a source device and a destination device, to perform operations comprising:
receiving information indicative of media rendering capabilities of the destination device, the media rendering capabilities including at least one of: an audio format and a video format;
accessing a control profile associated with the source device, wherein the control profile includes information on media rendering capabilities of the destination device;
determining whether at least a portion of data received from the source device is to be (a) processed at the intermediate device, or (b) processed at the destination device and extracted in a reverse path by the intermediate device, the determination being based on (i) identifying, from the control profile, that the source device is capable of generating a particular audio format and/or video format, and (ii) determining, from the media rendering capabilities of the destination device, whether the destination device is incapable of processing the particular audio format and/or video format;
responsive to a determination that at least the portion of the data received from the source device is to be processed at the intermediate device, generating updated capability information to replace at least a portion of the media rendering capabilities of the destination device with information indicative of the particular audio format and/or video format of the intermediate device;

responsive to a determination that at least the portion of the data received from the source device is to be processed at the destination device and extracted in the reverse path by the intermediate device, excluding corresponding media rendering capabilities of the intermediate device from the updated capability information:

and transmitting the updated capability information to the source device, wherein the updated capability information is used by the source device to generate the data.

26. The method of claim 1, wherein the information indicative of media rendering capabilities of the destination device includes information on at least one of:
  a support capability of a communication channel between the intermediate device and the destination device, and
  an availability of delay information from the destination device, wherein the delay information pertains to synchronizing an audio output with a video output of the destination device.

27. The device of claim 14, wherein the information indicative of media rendering capabilities of the destination device includes information on at least one of:
  a support capability of a communication channel between the device and the destination device, and
  an availability of delay information from the destination device, wherein the delay information pertains to synchronizing an audio output with a video output of the destination device.

28. The method of claim 1, wherein
  the audio format comprises one of: two-channel audio data, five-channel audio data, linear pulse code modulation, or two channel pulse code modulation.

29. The method of claim 26, wherein the communication channel between the intermediate device and destination device comprises a wired digital link, a wireless digital link, or an HDMI-Audio Return Channel.

30. The method of claim 26, wherein the determination to process the portion of data at the intermediate device is based also on the availability of delay information from the destination device.

31. The electronic device of claim 27, wherein the determination to process the portion of data is based also on the availability of delay information from the destination device.

* * * * *